United States Patent [19]
Peterson

[11] Patent Number: 5,893,972
[45] Date of Patent: Apr. 13, 1999

[54] SECTORS FOR ROTARY DISC FILTERS HAVING CONVEX, CURVED, RADIAL SIDE EDGES

[76] Inventor: John G Peterson, #4 Chelsea La., Vicksburg, Miss. 39180

[21] Appl. No.: 08/885,416

[22] Filed: Jun. 30, 1997

Related U.S. Application Data

[63] Continuation-in-part of application No. 08/665,723, Jun. 18, 1996, Pat. No. 5,766,466
[60] Provisional application No. 60/021,097, Jul. 2, 1996.
[51] Int. Cl.$^6$ .................................................. B01D 29/39
[52] U.S. Cl. .................... 210/331; 210/346; 210/486; 210/497.3; 210/498
[58] Field of Search ........................ 210/323.1, 331, 210/345, 346, 347, 486, 497.3, 498

[56] References Cited

U.S. PATENT DOCUMENTS

| | | | |
|---|---|---|---|
| 4,159,951 | 7/1979 | Davis | 210/331 |
| 4,285,817 | 8/1981 | Barthelemy | 210/486 |
| 5,766,466 | 6/1998 | Peterson | 210/323.1 |

*Primary Examiner*—David A. Reifsnyder
*Attorney, Agent, or Firm*—Terry M. Crellin

[57] ABSTRACT

A sector for a rotary disc filter has two elongate side channels that have a generally U-shaped cross section. Each side channel defines an open trough that faces the interior of the sector. The side channels have smooth, convex shapes forming smooth, rounded side edges extending laterally along the opposite radial sides of the sector. Filter media is formed as an envelope having a shape corresponding to the sector. The envelope fits over the sector, with the filter media curving smoothly over the curved side edges of the sector. The envelope is formed by superposed layers of filter media, and the layers are secured together at mutually respective side edges thereof. The side edges are joined together by a mechanical clamp system or by a strip of polymeric material that is melted and infused into the side edges of the filter media. A clamp system on the sector bell attaches the truncated end of the filter media to the sector bell. Plow members on the radial rods of the disc filter to plow a path into the slurry being filtered to alleviate wear and tear on the leading edges of the sectors. A relatively thick, curved bar at the perimeter of the sector has arcuate, flat side plates attached thereto, and the filter media is held in place between the flat side plates and the curved bar.

25 Claims, 5 Drawing Sheets

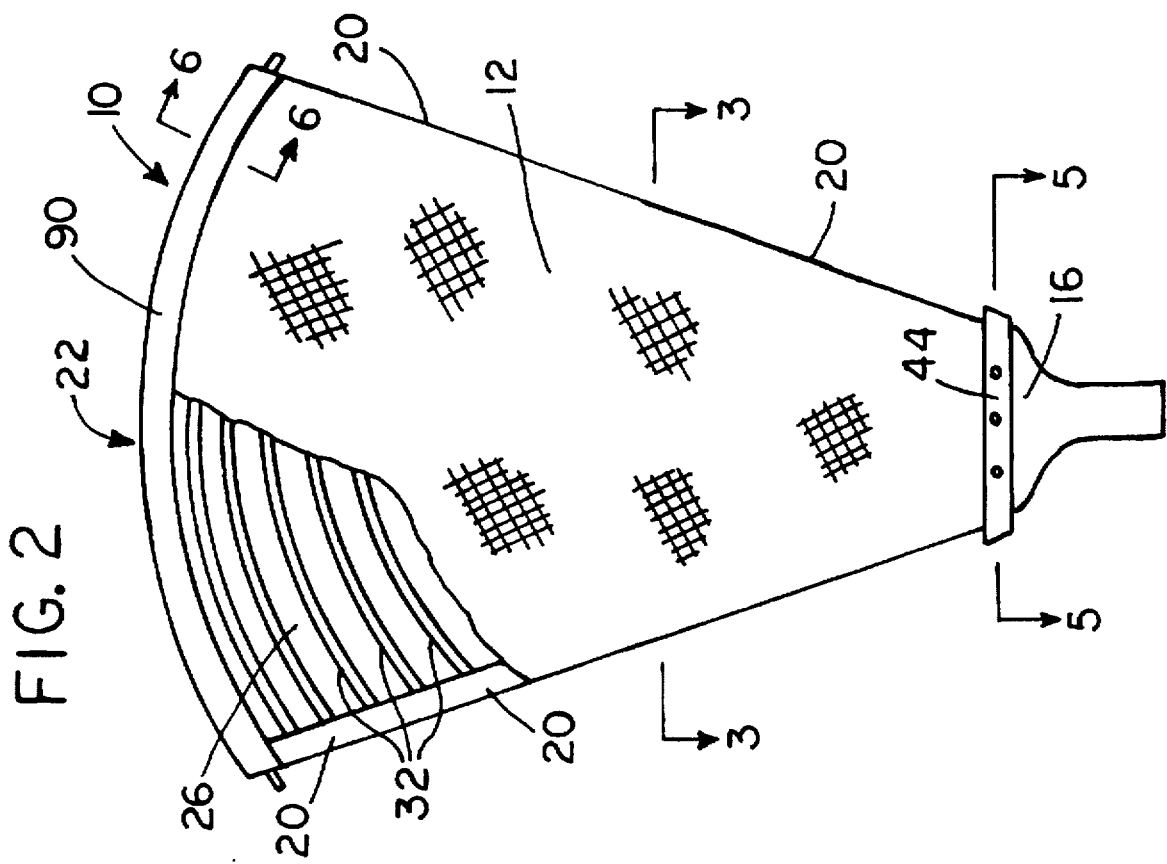
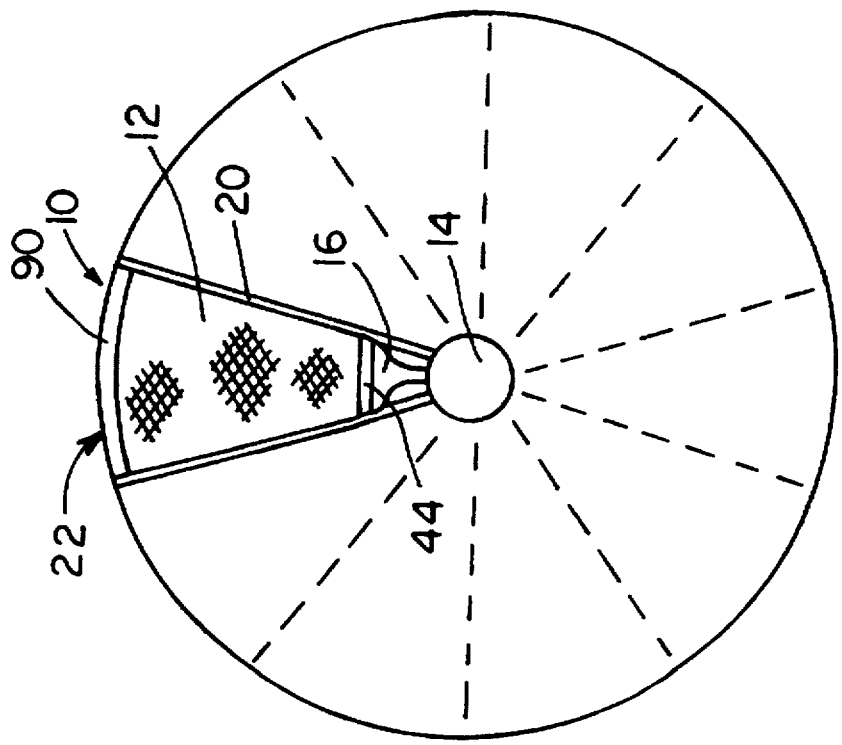

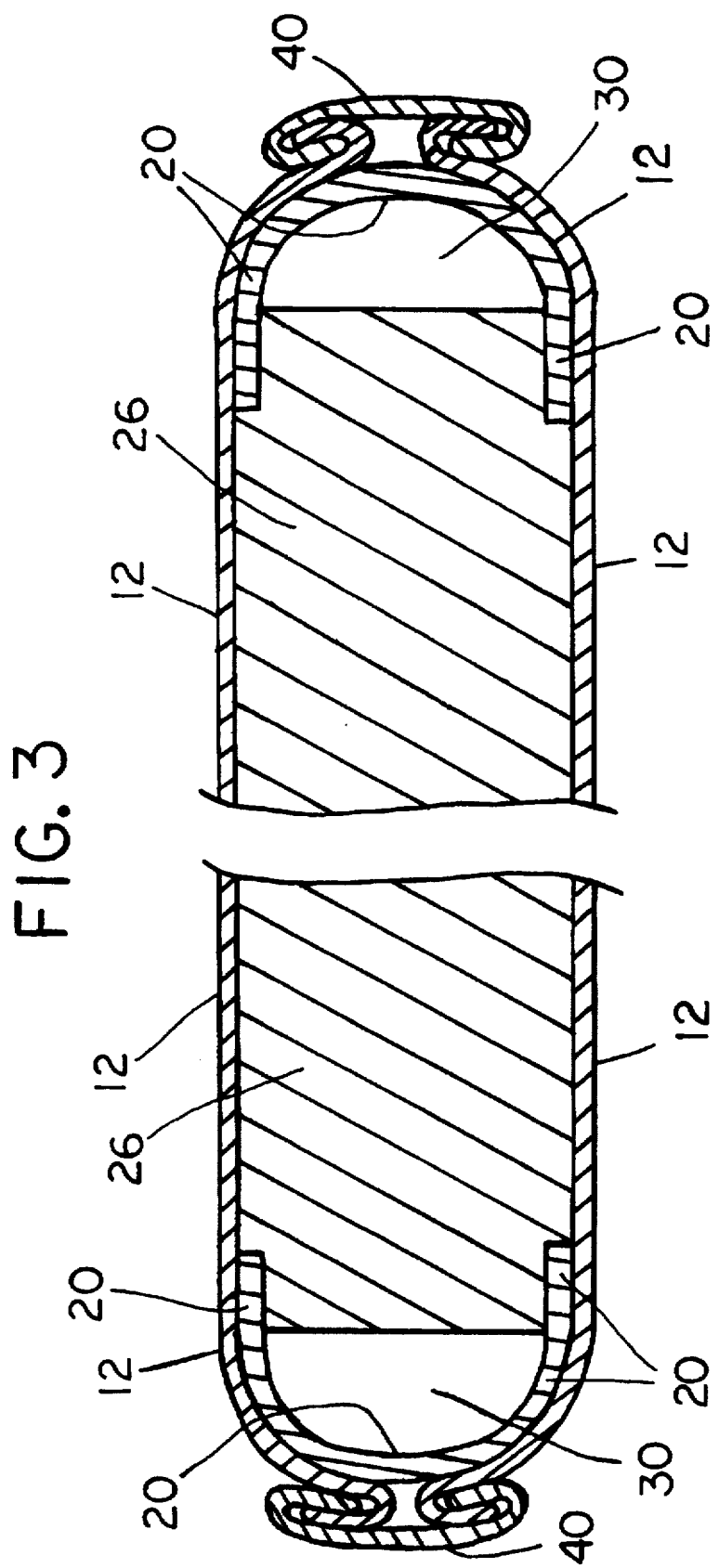

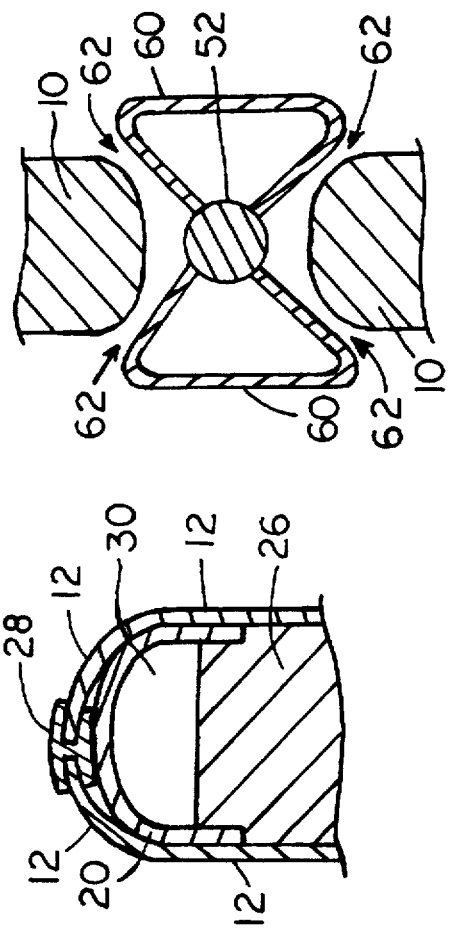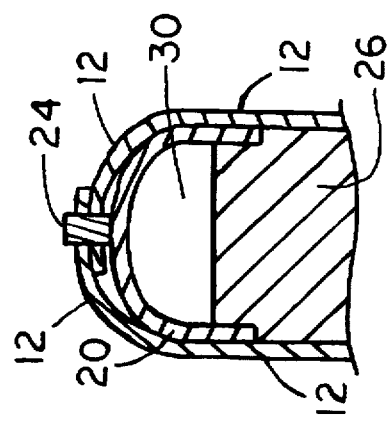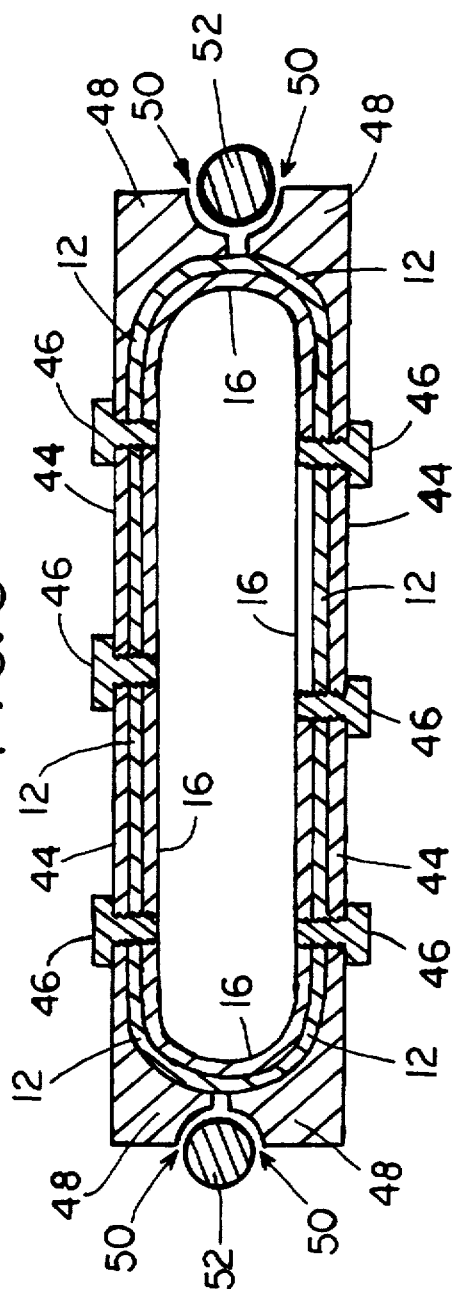

SECTORS FOR ROTARY DISC FILTERS HAVING CONVEX,CURVED, RADIAL SIDE EDGES

RELATED APPLICATIONS

This application claims the benefit of U.S. Provisional Application No. 60/021,097, filed Jul. 2, 1996.

This is a continuation-in-part application of my U.S. patent application Ser. No. 08/665,723 which was filed on Jun. 18, 1996 now U.S. Pat. No. 5,766,466 and was entitled "Sectors for Rotary Disc Filters Having Flow Channels that Are Parallel and Aligned Toward Elongate Side Channels at Radial Sides of the Sector." The entire contents of the application Ser. No. 08/665,723 now U.S. Pat. No. 5,766, 466 is incorporated herein by reference.

BACKGROUND OF THE INVENTION

1. Field of the Invention

The present invention relates to rotary disc filters and in particular to novel sectors for such filters in which the opposite, lateral, radial side edges of the sectors have a smooth, continuous curved shape that forms a smooth, rounded, convex side extending laterally along the opposite radial sides of each sectors. The curved side edges of the sectors accommodate use of novel filter media that slips over the sector in envelope fashion and is attached to the inner and outer ends of the sector. The filter media is formed from two flat pieces of material that are superposed on each other with the opposite side edges of the pieces being attached together to form a smooth, curved edge that fits laterally along the radial side edges of the sector when the filter media is slipped over the sector in envelope fashion. The present invention also relates to sectors having a novel bell clamp for securing the filter media to the bell of the sector and a novel mechanism for attaching the filter media to the outer periphery of the sector. In addition, the present invention further relates to novel guide and protection members that are attached to radial rods of the disc filter apparatus wherein the guide and protection members accommodate removal and installation of a sector on a disc filter. The guide and protection members further provide a leading, plow-like member that reduces wear and tear on the leading edges of the sectors when the filter apparatus is being used with compacted slurries or in freezing conditions wherein frozen solids tend to form at the surface of the slurry.

2. State of the Art

There are various types of filters that utilize a moving filter medium. Disc filters utilize a rotating disc that revolves so that during a portion of its movement it is submerged in a liquor or slurry that is to be filtered. Filter media is supported on a support member forming a sector of the disc. The disc rotates so that the surface of the filter medium is submerged beneath the surface of a slurry for a portion of its rotary travel, with filter cake being deposited on the surface of the filter medium when the filter medium is submerged. In the second portion of the rotary travel of the disc or drum, the filter medium travels in the atmosphere above the slurry, and filter cake is removed from the filter medium during the portion of its movement when it is not submerged in the slurry being filtered.

Normal construction of a disc filter includes a series of relatively thin, circular disc members secured at rather close intervals along a shaft. Each disc is generally composed of a series of segments commonly called sectors. The sectors are covered by filter medium to provide filtering on both sides of the sector. The sectors have a peripheral frame holding a filter media support member. The filter media support member is a relatively thin, planar member having grooves formed in the broad, outer surfaces thereof to allow liquid being filtered to drain from the support member when the sector moves out of the slurry being filtered.

The filter media support members have been made out of wood as well as cast from polymeric materials. Heretofore, it has been the universal practice to form indented, concave side edges along the lateral, radial sides of the filter media support members, whether made of wood or polymeric materials. The concave side edges were used to guide the edge of the sector along radial rods of the filter as the sector was being removed from or installed on the filter apparatus. In addition, when the sectors are made of wood, the wood can warp. The concave side edges of sectors made of wood formed a mechanical lock with the radial rods of the filter apparatus to minimize distortion of the sector due to warping of the wood from which the sector was made.

The sectors of a disc filter have the general shape of a sector of a circle, with the center of the sector of the circle being truncated so that a sector bell can be attached to the sector. The filter media has been formed as a bag that has the general shape of a sector of a circle, with the tip of the bag being truncated so that the bag is open at its tip and at its end opposite the tip. The universal practice of the prior art was to place the filter media support member within the filter bag, with the truncated end of the filter bag fitting around the sector bell and being clamped to the drain pipe of the sector bell. The outer periphery of the filter bag has been attached to the periphery of the filter media support member by various means such as by being stapled or otherwise secured to the periphery of the filter media support member. When using filter media that is relatively stiff, and especially metal screen, it is relatively difficult to form the side edges of the filter media into the concave side edges of the conventional filter sectors. In addition, it is relatively difficult to clamp the truncated, inner end of a filter bag made of a relatively stiff filter media to the drain pipe of the sector bell.

BRIEF DESCRIPTION AND OBJECTS OF THE INVENTION

According to the present invention, I have discovered that it is highly advantageous to provide a filter media support member that has the general shape of the sector and is restrained between two elongate side channels extending outwardly from the central shaft of the disc filter apparatus so that the side channels diverge from each other to form the radial sides of the sector. Each side channel defines an open trough that faces the interior of the sector, with the trough positioned alongside a side edge of the filter media support member. By facing the interior of the sector, the side channels form smooth, rounded, continuous, convex-curved side edges of the sector.

The filter media support member, as described in my previous application Ser. No. 08/665,723, filed Jun. 18, 1996 now U.S. Pat. No. 5,766,466 preferably has elongate flow channels formed on opposite broad surfaces thereof. These flow channels are preferably parallel with each other as well as being aligned in a direction from a radial axis through the filter media support member toward the elongate side channels at the side edges of the filter media support member. The elongate side channels form radial sides of the sector. Liquid in the flow channels flows to the trough formed by the elongate side channel at the radial side of the sector and is then directed through the trough into the fluid handling system incorporated in the central shaft of the disc filter apparatus.

The smooth curved or rounded edges of the side channels of the sector allows the filter media to be formed as an envelope which is shaped to correspond to the shape of the sector. The envelope is fit over the sector from the sector bell portion to the outer periphery of the sector, and the filter media of the envelope curves smoothly and evenly over the curved side edges of the side channels of the sector. The filter media at the side edges of the sector need not be reinforced as in the prior art inasmuch as strain incurred as the filter media curves smoothly around the convex curve of the sides of the sector is far less than the sever strain incurred when the filter media must be forced to conform to the rather sharp, indented, concave shape of the side edges of the sectors of the prior art.

In a particularly preferred aspect of the present invention, it has been found that when the filter media is made of a wire screen or other similarly stiff material, the envelope is formed by superposed layers of the material that have the shape of the broad flat sides of the sector. In this particular embodiment of the invention, the two layers of filter media are secured together along a line that follows the side edges of the sector. The two layers are joined by a novel, mechanical clamping system The novel clamping system, which will be described in detail hereinafter, is capable of readily conforming to the curved side edges of the sector while securely holding the two layers of filter media together in an envelope-type configuration that is readily slipped over the sector from the sector bell portion to the outer periphery of the sector.

The concave side edges of the sectors of the prior art did have one useful utility that was found serendipitously by workmen. These workmen found that the grooved sides of the sectors could be guided along the radial rods when sectors were being removed from and replaced in the filter during maintenance of the filter. The sector was not only guided along the radial rods, but the radial rods were allowed to support the weight of the sector as it was being guided along the radial rods. This greatly facilitated removal and reinstallation of the sectors in the filter apparatus.

Two novel constructions are proposed by the present invention to perform the function of guidance of the sectors when removing and replacing the sectors during maintenance of the filter apparatus. In the first construction, a bell clamp is provided that serves the additional purpose of securing the truncated tip end of the filter media to the sector bell as will as of providing a guidance means for sliding the sectors along the radial rods of the filter apparatus when removing and replacing the sectors of the filter apparatus. The bell clamp comprises two elongate members that are secured across the sector bell. The truncated end of the filter media is clamped securely between the two elongate members and the sector bell. The opposite ends of the two elongate members extend slightly beyond the radial sides of the sector. The opposite ends of the two elongate members form a pair of indented, concave receptacles at the opposite ends of the two elongate members that, as will be described more fully hereinafter, can slide along a radial rod of the filter apparatus as a sector is being removed from or installed on the filter apparatus.

In the second novel construction of means for guidance of a sector along a radial rod of the filter apparatus, a pair of channels are provided on the radial rods, with the channels running lengthwise along the radial rods. Each of the pair of channels opens diametrically opposed to each other and toward a side edge of a respective sector. The sector can be removed and reinstalled by sliding the rounded side edge of the sector in a respective channel on the radial rod. In this latter embodiment, the two channels on each of the radial rods extend outwardly from the respective radial rod so as to extend transversely of a plane through the disc of the filter that passes through the centerlines of the radial rods of that disc. The pair of channels on each radial rod have a combined width that is slightly greater than the width of the sector. In disc filter apparatus of the prior art, the leading side edges of the sector are prone to being damaged as the leading side edge moves through a heavy concentration of solids. The heavy concentration of solids can be solids that have settled out in the bottom of the filter or filter cake that has compacted in the filter tank crennulations. A situation similar to encountering heavy concentration of solids is when freezing conditions occur and the leading edge of the sector engages frozen solids. The channels on the radial rods are slightly wider than the width of the sectors, and the channels thus plow through the compacted or frozen material ahead of the leading side edges of the sectors and thus alleviate wear and tear on the leading side edges of the sectors.

In another preferred embodiment of the invention, a novel construction of the outer periphery of the sector is provided. In this construction, which will be described more fully hereinafter, a simplified system is provided for attaching the perimeter of the filter media to the periphery of the sector. In addition, the construction provides a readily assembled peripheral frame that ties the sector together. The peripheral frame is attached to the side edges of the sector, and the peripheral frame further has means for engaging the radial rods at the opposite sides of the sector to maintain the perimeter of the sector in proper alignment between adjacent radial rods.

A principal object of the present invention is to provide a filter media support member for a rotary disc filter wherein the opposite, lateral, radial side edges of the filter media support member have a smooth, continuous curved shape that forms a smooth, rounded convex side edges extending laterally along the opposite radial sides of the filter media support member.

Another object of the present invention is to provide a novel filter media that slips over the filter media support member in envelope fashion and is attached to the inner and outer ends of the filter media support member, wherein the filter media is formed from two flat pieces of material that are superposed on each other with the opposite side edges being attached together to form a smooth curved edge that fits laterally along the radial side edges of the filter media support member when the filter media is slipped over the filter media support member in envelope fashion.

A further object of the invention is to provide a novel bell clamp for securing the filter media to the bell of the sector.

A still further object of the invention is to provide guide and protection members that are attached to radial rods of the disc filter apparatus, wherein the guide and protection members accommodate removal and installation of a sector on a disc filter as well as provide a leading, plow-like member that reduces wear and tear on the leading edges of the sectors when the filter apparatus is being used with compacted slurries or in freezing conditions wherein frozen solids tend to form at the surface of the slurry.

Additional objects and features of the invention will become apparent from the following detailed description, taken together with the accompanying drawings.

THE DRAWINGS

Preferred embodiments of the present invention representing the best modes presently contemplated of carrying out the invention are illustrated in the accompanying drawings in which.

FIG. 1 is a schematic view of a sector and its positioning on a shaft to form a portion of a disc filter;

FIG. 2 is a side view of a broad side of one preferred embodiment of a sector in accordance with the present invention, showing the sector ready for installation in a disc filter apparatus;

FIG. 3 is a cross section through the sector of FIG. 2 taken along line 3—3 of FIG. 2;

FIGS. 4 and 4(a) are cross sections through the overlapped or abutted sides of two pieces of material used in making a filter bag, with a melted polymeric material being used to form a polymeric weld between the overlapped or abutted edges of the two pieces of material;

FIG. 5 is a cross section through the sector of FIG. 2 taken along line 5—5 of FIG. 2;

FIG. 9 is a cross section through a radial rod and a portion of the sides of respective sectors adjacent to the radial rod, showing novel guidance and protection members attached to the radial rods in accordance with the present invention.

DETAILED DESCRIPTION OF THE ILLUSTRATED EMBODIMENTS

Figure 8:
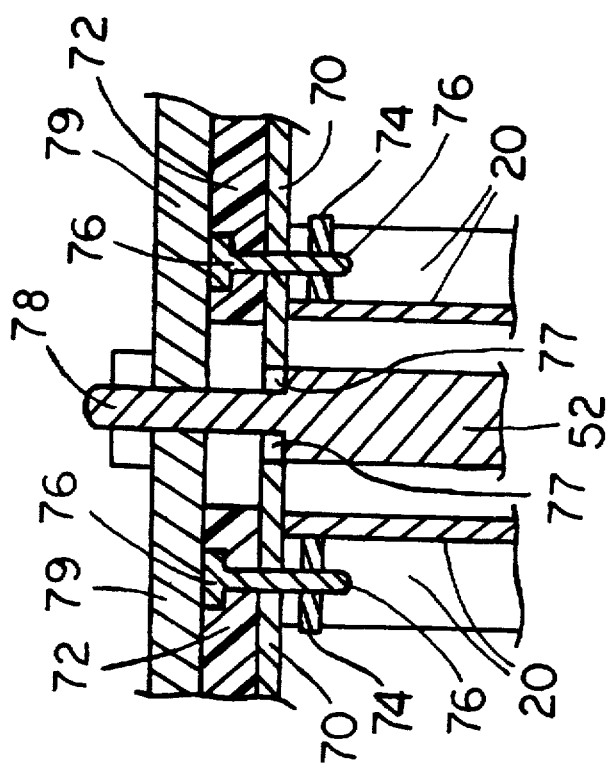
FIG. 8 is a cross section through the attachment of FIG. 6.

Referring to the drawings, several embodiments of sectors for use with rotary disc filters are illustrated. Like parts in each of the figures of the drawings will be identified with the same reference numerals.

Preferred embodiments of sectors in accordance with the present invention for use on a rotary disc filter are illustrated in the drawings A disc filter, as shown diagrammatically in FIG. 1 commonly has a plurality of similar wedge shaped filter sectors 10. The sectors 10 form a continuous disc, and the disc rotates about its central axis or hub. The disc rotates in approximately one-half of its travel beneath the surface of a pool of liquid, usually a slurry.

Each individual sector 10 is covered by a filter medium 12. Means as are commonly known in the art are used to draw a reduced pressure within the sector 10 as the sector is moving beneath the surface of the liquid. Liquid is drawn through the filter medium 12 as the sector 10 moves through the pool, and a filter cake is built up on the external surfaces of filter medium 12 covering the sector 10. The filter medium 12 is made of any usable type cloth or screen, including fiber cloth made from natural and synthetic fibers, woven wire cloths and wire screens.

As each sector 10 emerges from the pool and rotates above the pool, fluid is drained from the sector 10 through a series of flow channels in the sector 10. The fluid is fed from the flow channels in the sector 10 to a fluid handling system incorporated in the central shaft 14 of the filter apparatus. The fluid handling system incorporated in the central shaft 14 of the filter apparatus is well known in the art and will not be further described herein. The sector 10 of the present invention utilizes a conventional sector bell 16 that is mounted to the central shaft 14 of the filter apparatus and couples the sector 10, including the flow channels therein, to the central shaft 14.

In accordance with a preferred embodiment of the present invention, a sector 10 is provided that comprises two elongate side channels 20 extending substantially radially outwardly from a central shaft 14 of the rotary disc filter. The side channels 20 diverge from each other to form the radial sides of the sector 10. As shown in FIGS. 3, the side channels 20 have a generally U-shaped cross section so that each side channel defines an open trough that faces the interior of the sector 10. A sector bell 16 is attached to the central shaft 14 of the filter apparatus, and the side channels 20 are attached to the sector bell 16 so as to extend outwardly from the shaft 14 and the sector bell 16.

In accordance with the present invention, the radial sides of the sector have a smooth, continuously curved, convex shape that forms a smooth, rounded side extending laterally along the opposite radial sides of the sector 10. As best shown in FIG. 3, the convex, curved side edges of the sector 10 are advantageously provided by using side channels 20 that have a smooth, continuously curved, convex shape.

A novel elongate, arcuate, peripheral assembly 22, which will be described more fully hereinafter, extends between distal ends of the side channels 20 to form an arcuate perimeter of the sector 10. A substantially planar, filter media support member 26 is positioned between the two elongate channels 20 so as to occupy the inner space of the sector 10. The filter media support member 26 has its side edges received in the side channels 20 so that elongate fluid flow passages 30 are formed between the side edges of the support member 26 and the trough formed by the side channels 20.

The filter media support member 26 preferably has elongate flow channels 32 (FIG. 2) formed on opposite broad surfaces thereof so that the flow channels 32 are substantially parallel with each other as well as being aligned in a direction from a radial axis through the filter media support member 26 toward the elongate side channels 20. Thus, substantially all of the flow channels 32 open into the elongate flow passages 30 formed in the elongate side channels 20.

The flow channels 32 conduct fluid from the sector 10 to the elongate flow passages 30 when the sector rotates above the surface of the slurry being filtered. As the sector 10 initially rotates out of the slurry, fluid contained in the sector 10 flows through the flow channels 32 toward the flow passage 30 in the trailing side channel 20. As the sector 10 continues over the top of its upward rotation and begins its downward travel toward the slurry, any residual fluid in the sector flows to the flow passage 30 in the leading side channel 20. The elongate flow passages 30 in the side channels 20 conduct the fluid from the sector 10 to the fluid handling system of the central shaft 14 of the filter apparatus. The flow channels 32 in the filter media support member 26 can be linear or curvilinear and can be oriented in various patterns.

The rounded side edges of the sector 10 accommodates use of a novel filter bag that is constructed in envelope fashion and slips over the sector 10 in envelope fashion. The filter bag comprises two pieces of filter material 12 that have the general shape of the broad, flat surface of the sector 10. The pieces are joined together along their opposite lateral sides to form a bag that is open at its opposite ends, with the first end of the bag being curved in the shape of the periphery of the sector 10. The second end of the bag fits over the sector bell 16. In installing the filter bag on the sector 10, the first end of the bag is slipped over the sector bell 16, and the filter bag is then slid up over the sector 10 in envelope fashion. The two sides of the filter bag that are formed by the joined edges of the two pieces of filter material 12 that forms the filter bag lie lengthwise along the smooth, curved sides of the sector 10. The first end of the filter bag is attached to the periphery of the sector 10 by means of a novel periphery assembly 22 that will be described more fully hereinafter. The second end of the filter bag is secured to the sector bell 16 as will also be discussed in more detail hereinafter.

The sectors 10 of the present invention are ideally suited to accommodate filter bags in which the filter material 12 from which the bags are made comprises a relatively stiff material such as woven wire cloth, metal screens and textile materials having similar stiffness. A novel means for attaching the opposite side edges of the two pieces of rather stiff filter material 12 together is provided. As shown in FIG. 3, the novel means for attaching the opposite sides of the two pieces of filter material 12 together comprises an elongate metal strip 40. Opposite lateral side edges of the strip 40 are bent back over the central portion of the strip 40 so that the opposite side edges face each other and lie along the same face of the metal strip 40 to form an elongate clamp mechanism. The strip 40 has a width of from about 0.5 to 2.5 inches and preferably about 0.75 to 2.0 inches prior to having its opposite lateral side edges bent back upon themselves. The width of the bent back side edges of the strip 40 is between about 0.25 inch and 0.65 inch, preferably between about 0.35 inch and 0.5 inch.

The lateral side edges of each of the pieces of filter material 12 are bent back upon themselves so that the bent back edges can be received in respective spaces between the bent back sides of the strip 40 and the central portion of the strip 40. The strip 40 is then crimped so as to firmly hold the edges of the respective pieces of filter material 12 clamped within the spaces between the bent back sides of the strip 40 and the central portion of the strip 40. It is advantageous to further bend the central portion of the strip 40 so that it has a transverse cross-sectional shape that is similar to the transverse cross-sectional shape of the radial sides of the sector 10.

An alternative means of attaching the opposite sides of the two pieces of filter material 12 together is shown in FIG. 4. The two side edges of the two pieces of material 12 are overlapped by a distance of from about 1 inch to 2 inches. Melted polymeric material 24 is then infused into the two overlapped layers of filter material 12 and allowed to harden. Instead of overlapping the two pieces of material 12, they could be butted as shown in FIG. 4(a), with two layers 28 of polymeric material positioned along the opposite sides of the butted edge. The opposite side edges of the layers 28 of polymeric material would be melted and infused into the abutted pieces of filter material 12.

As mentioned previously, it is advantageous to provide a guidance means for guidance and support of the sector 10 during removal of the sector 10 from or installation of the sector 10 on the filter apparatus. In accordance with one embodiment of the present invention, a novel bell clamp is provided that serves the combined functions of securing the truncated, inner end of the filter bag to the sector bell 16 and providing means for guidance and support of the sector 10 when the sector is removed from and installed on the filter apparatus.

As illustrated in FIGS. 1, 2 and 5, the novel clamp for the sector bell 16 comprises elongate bars 44 that are attached to the sector bell 16 so that the elongate bars 44 extend across the face of the sector bell 16 while being oriented substantially parallel with the upper, flat surface of the sector bell 16. It is advantageous to secure the elongate bars 44 to the respective sides of the sector bell 16 using bolts 46 that extend through the elongate bars 44 and are threaded into opening in the sides of the sector bell 16.

The elongate bars 44 have inwardly curved horns 48 at their opposite ends that extend substantially normal from a common face of the elongate bar 44. As shown in FIG. 5, the two inner surfaces of the horns 48 (the surfaces that face toward the central axis of the sector 10 and thus toward each other) are provided with a shape that is similar to the curved, convex side of the sector 10. A space is provided between the mating ends of respective horns 48 on each side of the sector bell 16 so that the elongate bars 44 and horns 48 can be clamped tightly to the sector bell 16 by the bolts 46. The truncated end of the filter material 12 of the filter bag is received between the elongate bars 44 and the sector bell 16 on the flat sides of the sector bell 16 and between the horns 48 and the curved sides of the sector bell 16 at the sides of the sector bell 16. The filter bag is thus securely fastened to the sector bell 16 around the entire perimeter of the sector bell 16.

The outwardly facing surfaces of the horns 48 (the surfaces facing away from the sides of the sector 10) have a concave depression 50 formed therein. The depression 50 is advantageously formed by cutting away the outer corners of the ends of the horns 48 that face each other. The concave depression 50 is adapted to fit over and slide along a radial rod 52 of the filter apparatus to provide guidance and support for the sector 10 as it is being installed on and removed from the filter apparatus.

An alternative embodiment of means for guiding and supporting a sector 10 during removal from and installation on a filter apparatus is shown in FIG. 9. Elongate channels 60 are attached lenthwise along the opposite sides of each radial rod 52. As illustrated, the channels 60 have a width at their base which is significantly larger than the diameter of the radial rods 52. The opposite side legs of each channel 60 slant toward each other so that their free ends engage the radial rod. These free ends of the sides of the channels 60 are secured to the radial rods 52 as by welding. The pair of channels 60 form a pair of concave, elongate depressions 62 that run along the length of the radial-rod 52 between the respective channels 60. The depression 62 allows a round side edge of a sector 10 to be received therein, and the side edge of the sector 10 can be slid back and forth along the depression 62 as the sector 10 is being removed from and installed on a filter apparatus.

The channels 60 can be adapted to provide another novel feature. By making the legs of the channels 60 sufficiently long, the bases of the channels 60 will extend out slightly beyond the broad, flat surfaces of the sector 10, i.e., the distance between the bases of the channels 60 will exceed the thickness of the sector 10. When the sector 10 moves through the slurry being filtered, the channels 60 at the leading side edge of the sector 10 encounter the slurry prior to the leading edge of the sector 10. When a compacted or dense portion of slurry is encountered, the channels 60 plow a path through the compacted or dense slurry and thereby alleviate wear and tear on the leading edge of the sector 10 and filter medium at the leading edge of the sector 101.

Figure 6:
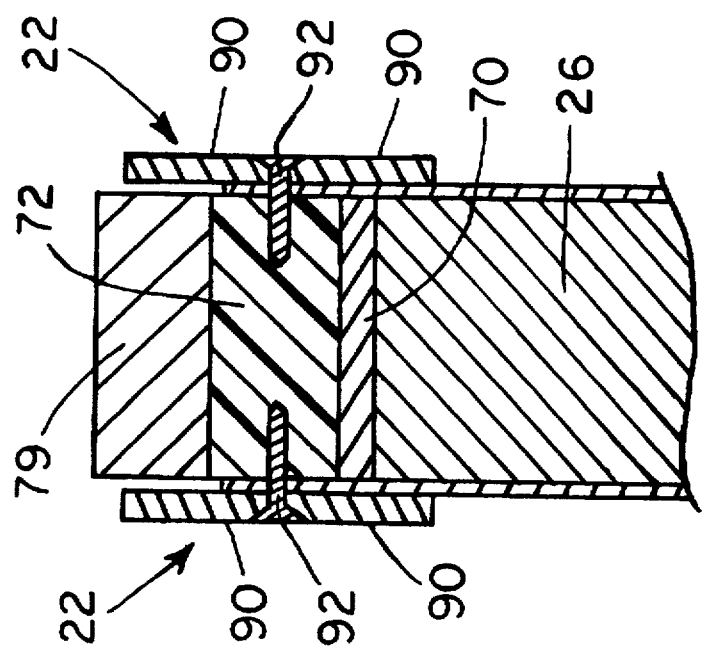
FIG. 6 is a cross section through the sector of FIG. 2 taken along line 6—6 of FIG. 2.
Figure 7:
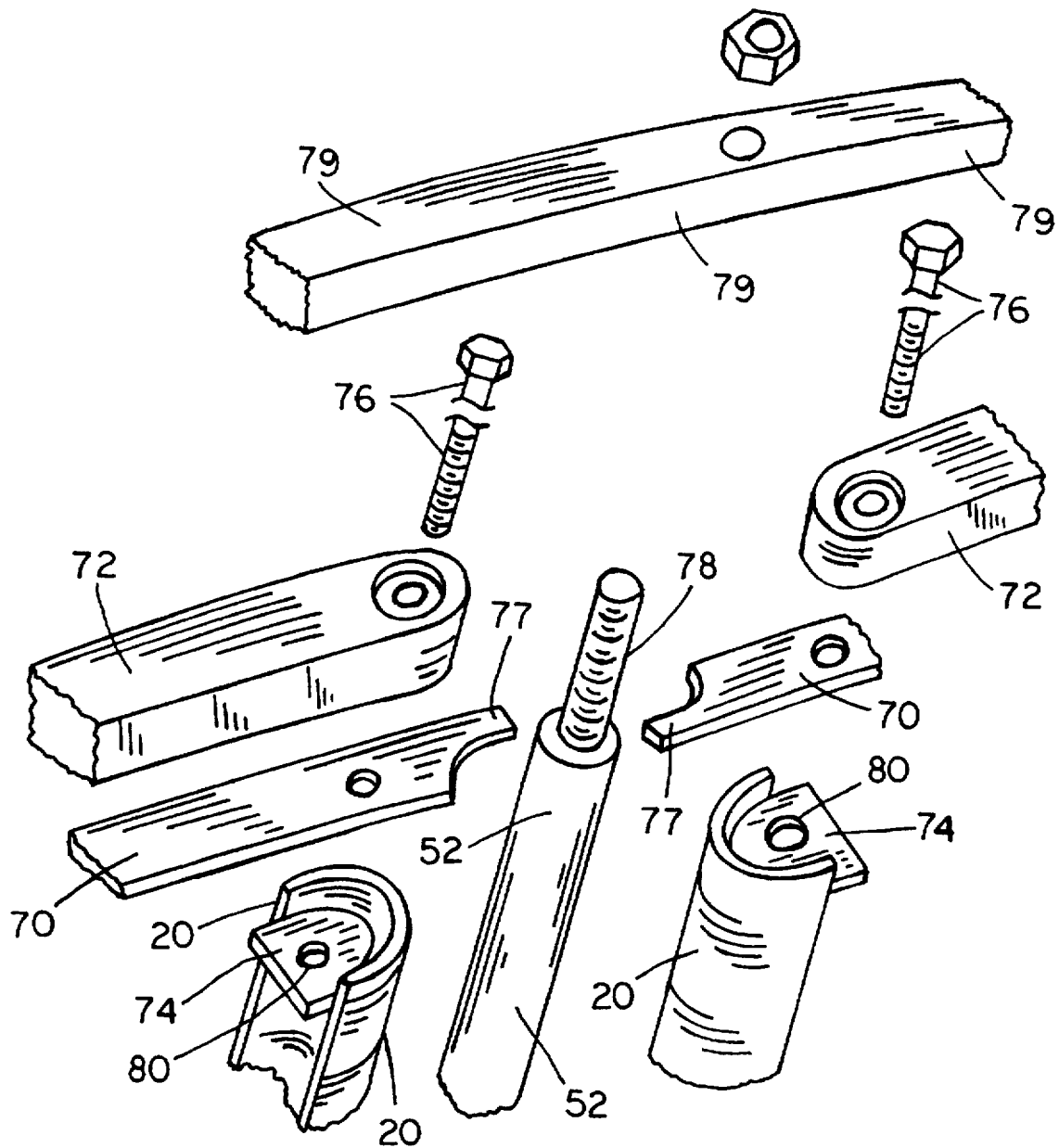
FIGS. 7 is an exploded pictorial view showing the attachment of the periphery frame member to the side channel of the sector and to a radial rod of the filter apparatus.

An elongate, arcuate, peripheral assembly 22 extends between distal ends of the side channels 20 to form an arcuate perimeter of the sector 10 As shown in FIGS. 6–8, a relatively thin, flat strip 70 of metal is placed longitudinally along the periphery of the filter media support member 26 of the sector 10. The flat strip 70 forms a rim at the periphery of the sector 10. This rim provides a superior edge mount for the sector 10. The rim is wider, and stronger than the periphery edges of prior art sectors. The flat strip 70 will have a thickness of about 0.0625 inch to 0.375 inch and a width that is essentially the same as the thickness of the filter media support member 26. A relatively thick bar 72 of dense, structural grade polymeric material is placed over the outer side of the strip 70. The bar 72 of polymeric material has a width essentially the same as the width of the strip 70 and a thickness of between about 0.375 inch and 2 inches.

The strip 70 and bar 72 are secured to respective side channels 20 of the sector 10 at the opposite ends of the strip 70 and bar 72. As best illustrated in FIGS. 7 and 8, a securing lug 74 is welded within the side channel 20 of the sector 10 near the distal end of the side channel 20. A bolt 76 extends through aligned openings in the bar 72 and the strip 70 and can either be received in a threaded opening 80 in the lug 74, or the bolt 76 can extend through the opening 80 in the lug 74 to a nut positioned beneath the lug 74. The right hand side of the strip 70 and bar 72 of one sector and the left hand side of the strip 70 and bar 72 of an adjacent sector are shown attached to the channels 20 of the respective sectors in FIGS. 7 and 80.

As shown in FIGS. 7 and 8, the distal end of the strip 70 extends beyond the side edge of the sector 10 and is attached securely to the radial rod 52 of the filter apparatus. The securing of the strips 70 from two adjacent sectors 10 to the radial rod 52 is advantageously achieved by notching out a recess on the distal end of the strip 70. The notched out recesses are formed on opposite sides of the strip 70 at the opposite respective ends of the strip 70. This allows the prongs 77 on respective ends of the strips 70 formed by the notches to lie adjacent opposite sides of the radial rod 52. The radial rod 52 has a stud 78 formed on its distal end, with a abutment formed at the base of the stud 78. The respective prongs 77 on the ends of the strip 70 lie on the abutment formed at the base of the stud 78 and are secured firmly thereto by a sector clamp 79 and nut.

As shown in FIGS. 1, 2 and 6, the peripheral assembly 22 that forms the perimeter frame of the sector 10 further includes a pair of essentially flat side plates 90 that are attached to the opposite sides of the strip 70 and bar 72. The flat plates 90 are substantially parallel with each other and extend outwardly from the opposite flat sides of the sector 10. As best shown in FIGS. 1 and 2, the flat side plates 90 have a curved shape resembling an arc of a rainbow, with the curved perimeter of the side plates 90 forming the outer periphery of the sector 10. The flat side plates 90 are attached to the bar 72 by spaced apart screws 92 that extend through the side plates 90 and into the bar 72. The filter material 12 of the filter bag is firmly held in place at the periphery of the sector by being positioned between the respective flat plates 90 and the bar 72. The filter material 12 need not be bent over the periphery of the sector, but can instead lie flatwise along the bar 72 to be held firmly in place by the side plates 90. This allows simple installation of very stiff filter material 12. The side plates 90 are readily removable from the sector 10 to allow quick, easy disassembly of the periphery of the sector 10 when the maintenance is being performed on the sector 10.

I claim:

1. An improvement in a sector used in a rotary disc filter, said sector being of the type having (1) two elongate side channels extending substantially radially outwardly from a central shaft of the rotary disc filter so that the side channels diverge from each other to form the radial sides of said sector, (2) an elongate, arcuate, peripheral member that extends between distal ends of said side channels to form an arcuate perimeter of said sector, and (3) a substantially planar, filter media support member positioned between said two elongate channels to occupy an interior of said sector, said improvement comprising said two elongate side channels have a generally U-shaped cross section so that each side channel defines an open trough that faces the interior of said sector;

said two elongate side channels have a smooth, continuously curved, convex shape that forms smooth, rounded side edges extending laterally along the opposite radial sides of said sector; and a filter media that is formed as an envelope having a shape corresponding to the shape of said sector, with said envelope fitting over said sector so that the filter media of said envelope curves smoothly over the curved side edges of said side channels of said sector.

2. The improvement in a sector in accordance with claim 1 wherein said envelope is formed by superposed layers of the filter media that have the shape of broad flat sides of said sector; and the superposed layers are secured together at mutually respective side edges of said superposed layers of filter media to form joined side edges that lie along respective side edges of said sector when the filter media is slipped over said sector, with said joined side edges forming smooth, curved edges that fit laterally along the radial side edges of said sectors.

3. The improvement in a sector in accordance with claim 2 wherein the respective side edges of said superposed layers of filter media are joined together by a mechanical clamp system which is capable of readily conforming to the curved side edges of said sector.

4. The improvement in a sector in accordance with claim 3 wherein said mechanical clamp system comprises an elongated metal strip whose opposite lateral side edges are bent back over a central portion of the strip so that the opposite side edges face each other and lie along a same face of the metal strip;

respective lateral side edges of said superposed layers of filter media are bent back upon themselves, with the bent back edges being received in respective spaces between the bent back sides of said metal strip and the central portion of said metal strip, with said metal strip being crimped so as to firmly hold the side edges of the respective superposed layers of filter media clamped together; and bending the central portion of the metal strip so that it has a transverse cross-sectional shape that is similar to the transverse cross-sectional shape of the radial sides of said sector.

5. The improvement in a sector in accordance with claim 2 wherein the respective side edges of said superposed layers of filter media are joined together by a strip of polymeric material that is melted and infused into the side edges of said superposed layers.

6. A further improvement in a sector in accordance with claim 1 wherein a sector bell is provided at a truncated end of said sector, with said further improvement comprising elongate bars that are attached to the sector bell so that the elongate bars extend across respective faces of the sector bell while being oriented substantially parallel with an upper, flat surface of the sector bell;

inwardly extending horns at opposite ends of said elongate bars, said inwardly extending horns having inner surfaces that face respective convex, curved side edges of said sector bell, with the inner surfaces of said inwardly extending horns having a curved shape that is similar to the convex, curved side edges of said sector bell; and a truncated end of said filter media is received between the elongate bars and a perimeter of said sector bell to securely clamp the truncated end of said filter media to said sector bell around the entire perimeter of said sector bell.

7. The improvement in a sector in accordance with claim 6 wherein outwardly facing surfaces of said horns that face away from the side edges of said sector have concave depressions formed therein, said concave depressions being adapted to fit over and slide along a radial rod of said rotary disc filter to provide guidance and support for said sector as it is being installed on and removed from said rotary disc filter.

8. The improvement in a sector in accordance with claim 7 wherein said concave depressions are formed by cutting away distal, outer corners of said horns.

9. A further improvement in a sector in accordance with claim 1 wherein said rotary disc filter has conventional radial rods that are positioned between sectors and extend outwardly from a central shaft of said rotary disc filter, with said further improvement comprising a pair of elongate channels attached lengthwise along opposite sides of each of said radial rods;

each of said channels having a width at its base which is larger than the diameter of said radial rods;

each of said channels having opposite side legs slanting from respective lateral side edges of said base toward each other, with the distal ends of said side legs being secured to a respective radial rod;

each pair of channels forming a pair of concave, elongate depressions that run along the length of the radial rod and face the side edges of an adjacent sector, whereby the round side edge of a respective sector is received in one of said concave, elongate depressions so that said sector can be slide back and forth along said concave, elongate depression as said sector is being removed from and installed on said rotary disc filter.

10. The improvement in a sector in accordance with claim 9 wherein the legs of said channels are sufficiently long so that the bases of said channels extend at least slightly beyond broad, flat surfaces of respective sectors so that a distance between respective bases of each pair of channels exceeds the thickness of said sectors, whereby when the sectors move through a slurry that is being filtered, said channels at a leading side edge of each of said sectors encounter the slurry prior to the leading edges of said sector so that the channels plow a path into said slurry and thereby alleviate wear and tear on leading edges of said sectors and the filter media at the leading edge of said sectors.

11. The improvement in a sector in accordance with claim 1 further including an improved peripheral assembly comprising a relatively thick, elongate, curved bar lying longitudinally along an arcuate perimeter of the filter media support member to form a rim at the perimeter of said sector;

means for securing opposite ends of said relatively thick, elongate, curved bar to respective side channels of said sector; and arcuate, flat side plates attached to opposite sides of said relatively thick, elongate, curved bar, whereby the filter media at the perimeter of said sector is firmly held in place by being positioned between respective flat side plates and said relatively thick, elongate, curved bar.

12. The improvement in a sector in accordance with claim 11 wherein said relatively thick, elongate, curved bar is made of dense, structural grade, polymeric material;

a relatively thin, flat, metal strip is positioned between the arcuate perimeter of the filter media support member and said relatively thick, elongate, curved bar; and means are provided for securing said relatively thin, flat, metal strip to respective side channels of said sector.

13. The improvement in a sector in accordance with claim 12 wherein said relatively thin, flat, metal strip has projections that extend beyond each of said respective side channels; and means are provided for securing said projections to respective radial rods of said rotary disc filter.

14. An improvement in a sector used in a rotary disc filter, said sector being of the type having (1) two elongate side edges extending substantially radially outwardly from a central shaft of the rotary disc filter so that the side edges diverge from each other to form the radial sides of said sector, (2) an elongate, arcuate, peripheral member that extends between distal ends of said side channels to form an arcuate perimeter of said sector, and (3) a substantially planar, filter media support member positioned between the radial sides of said sector to occupy an interior of said sector, said improvement comprising a filter media that is formed as an envelope having a shape corresponding to the shape of said sector, with said envelope fitting over the filter media support member;

said envelope is formed by superposed layers of the filter media that have the shape of broad flat sides of said sector; and the superposed layers are se-cured together at mutually respective side edges of said superposed layers of filter media to form joined side edges that lie along respective side edges of said filter media support member.

15. The improvement in a sector in accordance with claim 14 wherein the respective side edges of said superposed layers of filter media are joined together by a mechanical clamp system which is capable of readily conforming to the curved side edges of said sector.

16. The improvement in a sector in accordance with claim 15 wherein said mechanical clamp system comprises an elongated metal strip whose opposite lateral side edges are bent back over a central portion of the strip so that the opposite side edges face each other and lie along a same face of the metal strip; and respective lateral side edges of said superposed layers of filter media are bent back upon themselves, with the bent back edges being received in respective spaces between the bent back sides of said metal strip and the central portion of said metal strip, with said metal strip being crimped so as to firmly hold the side edges of the respective superposed layers of filter media clamped together.

17. The improvement in a sector in accordance with claim 14 wherein the respective side edges of said superposed layers of filter media are joined together by a strip of polymeric material that is melted and infused into the side edges of said superposed layers.

18. An improvement in a sector used in a rotary disc filter, said sector being of the type having (1) two elongate side edges extending substantially radially outwardly from a central shaft of the rotary disc filter so that the side edges diverge from each other to form the radial sides of said sector, (2) an elongate, arcuate, peripheral member that extends between distal ends of said side channels to form an arcuate perimeter of said sector, (3) a substantially planar, filter media support member positioned between the radial sides of said sector to occupy an interior of said sector, and (4) a sector bell that connects an inner, truncated end of said sector to said central shaft of said rotary disc filter, said improvement comprising a filter media that is formed as an envelope having a shape corresponding to the shape of said sector, with said envelope fitting over the filter media support member;

elongate bars that are attached to the sector bell so that the elongate bars extend across respective faces of the sector bell while being oriented substantially parallel with an upper, flat surface of the sector bell;

inwardly extending horns at opposite ends of said elongate bars, said inwardly extending horns having inner surfaces that face respective side edges of said sector bell, with the inner surfaces of said inwardly extending horns having a shape that is similar to the shape of the side edges of said sector bell; and a truncated end of said filter media is received between the elongate bars and a perimeter of said sector bell to securely clamp the truncated end of said filter media to said sector bell around the entire perimeter of said sector bell.

19. The improvement in a sector in accordance with claim 18 wherein outwardly facing surfaces of said horns that face away from the side edges of said sector have concave depressions formed therein, said concave depressions being adapted to fit over and slide along a radial rod of said rotary disc filter to provide guidance and support for said sector as it is being installed on and removed from said rotary disc filter.

20. The improvement in a sector in accordance with claim 19 wherein said concave depressions are formed by cutting away distal, outer corners of said horns.

21. An improvement in a sector used in a rotary disc filter, said sector being of the type having (1) two elongate side edges extending substantially radially outwardly from a central shaft of the rotary disc filter so that the side edges diverge from each other to form the radial sides of said sector, (2) an elongate, arcuate, peripheral member that extends between distal ends of said side channels to form an arcuate perimeter of said sector, (3) a substantially planar, filter media support member positioned between the radial sides of said sector to occupy an interior of said sector, and (4) radial rods that are positioned between sectors and extend outwardly from a central shaft of said rotary disc filter, said improvement comprising a pair of elongate channels attached lengthwise along opposite sides of each of said radial rods;

each of said channels having a width at its base which is larger than the diameter of said radial rods;

each of said channels having opposite side legs slanting from respective lateral side edges of said base toward each other, with the distal ends of said side legs being secured to a respective radial rod;

each pair of channels forming a pair of concave, elongate depressions that run along the length of the radial rod and face the side edges of an adjacent sector, whereby the side edge of a respective sector is received in one of said concave, elongate depressions so that said sector can be slide back and forth along said concave, elongate depression as said sector is being removed from and installed on said rotary disc filter.

22. The improvement in a sector in accordance with claim 21 wherein the legs of said channels are sufficiently long so that the bases of said channels extend at least slightly beyond broad, flat surfaces of respective sectors so that a distance between respective bases of each pair of channels exceeds the thickness of said sectors, whereby when the sectors move through a slurry that is being filtered, said channels at a leading side edge of each of said sectors encounter the slurry prior to the leading edges of said sector so that the channels plow a path into said slurry and thereby alleviate wear and tear on leading edges of said sectors and the filter media at the leading edge of said sectors.

23. An improvement in a sector used in a rotary disc filter, said sector being of the type having (1) two elongate side edges extending substantially radially outwardly from a central shaft of the rotary disc-filter so that the side edges diverge from each other to form the radial sides of said sector, (2) a substantially planar, filter media support member positioned between the radial sides of said sector to occupy an interior of said sector, and (3) a filter media that is formed as an envelope having a shape corresponding to the shape of said sector, with said envelope fitting over the filter media support member, said improvement comprising a relatively thick, elongate, curved bar lying longitudinally along an arcuate perimeter of the filter media support member to form a rim at the perimeter of said sector;

means for securing opposite ends of said relatively thick, elongate, curved bar to respective radial sides of said sector; and arcuate, flat side plates attached to opposite sides of said relatively thick, elongate, curved bar, whereby the filter media at the perimeter of said sector is firmly held in place by being positioned between respective flat side plates and said relatively thick, elongate, curved bar.

24. The improvement in a sector in accordance with claim 23 wherein said relatively thick, elongate, curved bar is made of dense, structural grade, polymeric material;

a relatively thin, flat, metal strip is positioned between the arcuate perimeter of the filter media support member and said relatively thick, elongate, curved bar; and means are provided for securing said relatively thin, flat, metal strip to respective radial sides of said sector.

25. The improvement in a sector in accordance with claim 24 wherein said relatively thin, flat, metal strip has projections that extend beyond each of said respective side channels; and means are provided for securing said projections to respective radial rods of said rotary disc filter.

\* \* \* \* \*